United States Patent
Ari

(10) Patent No.: US 9,574,682 B2
(45) Date of Patent: Feb. 21, 2017

(54) METHOD OF DETERMINING AN OPERATING STATE OF A TRANSMISSION LATCHING VALVE

(71) Applicant: Schaeffler Technologies GmbH & Co. KG, Herzogenaurach (DE)

(72) Inventor: Vural Ari, Lynnfield, MA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 189 days.

(21) Appl. No.: 14/217,509

(22) Filed: Mar. 18, 2014

(65) Prior Publication Data

US 2014/0290750 A1  Oct. 2, 2014

Related U.S. Application Data

(60) Provisional application No. 61/806,980, filed on Apr. 1, 2013.

(51) Int. Cl.
*F16K 31/00* (2006.01)
*F16K 37/00* (2006.01)

(52) U.S. Cl.
CPC ......... *F16K 37/0083* (2013.01); *F16K 31/003* (2013.01); *F16K 37/0041* (2013.01); *Y10T 137/0318* (2015.04); *Y10T 137/8225* (2015.04)

(58) Field of Classification Search
CPC .............. F16K 37/0083; F16K 37/0041; F16K 37/0058; F16K 31/003; Y10T 137/0318; Y10T 137/8225
USPC ................. 251/73, 74, 75, 129.04, 63.6, 62; 137/487.5, 554
See application file for complete search history.

(56) References Cited

U.S. PATENT DOCUMENTS

| 4,674,429 A * | 6/1987 | Buckle ...................... B63C 7/10 114/331 |
| 6,162,147 A | 12/2000 | Moorman |
| 7,862,002 B2 * | 1/2011 | Naitoh ................ F16K 31/1221 251/335.3 |
| 2003/0183792 A1 * | 10/2003 | Muraji ....................... F01L 9/04 251/129.04 |
| 2005/0092949 A1 * | 5/2005 | Wilhelm ............. F02D 35/0007 251/129.04 |
| 2009/0306830 A1 * | 12/2009 | Cummings ........... F15B 19/005 700/282 |
| 2010/0179697 A1 * | 7/2010 | Stelter ................... F16K 31/126 700/282 |
| 2011/0315503 A1 | 12/2011 | Ari et al. |
| 2012/0247564 A1 * | 10/2012 | Kho ........................ F16K 3/188 137/1 |
| 2013/0233396 A1 | 9/2013 | Lee et al. |

* cited by examiner

*Primary Examiner* — Craig Schneider
*Assistant Examiner* — Josephine Trinidad-Borges
(74) *Attorney, Agent, or Firm* — Kevin L. Parks

(57) ABSTRACT

A valve monitoring system includes a latching valve, a travel sensor, and a processor. The latching valve has a snap spring, a valve piston, and an inlet port. The travel sensor is for measuring travel of the valve piston between an activation pressure and a zero pressure. The processor is connected to the travel sensor for calculating a rate of travel of the valve piston and determining a latched state of the valve. In some example embodiments, the activation pressure is greater than a normal operating pressure. In some example embodiments, determining a latched state of the valve includes calculating a derivative of the rate of travel.

5 Claims, 4 Drawing Sheets

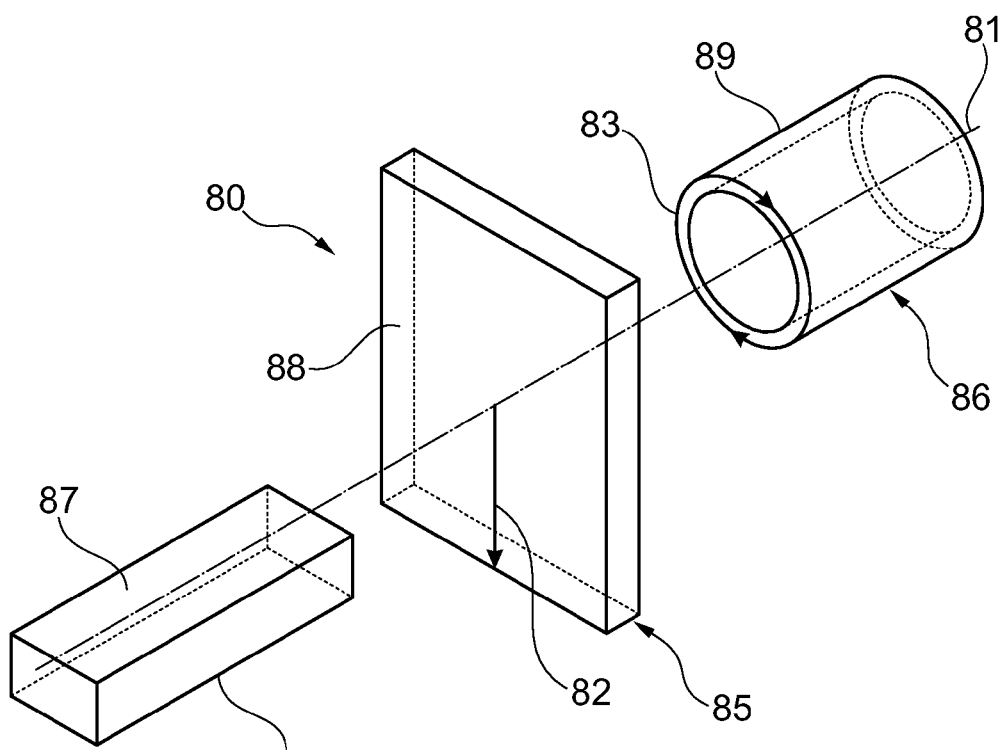
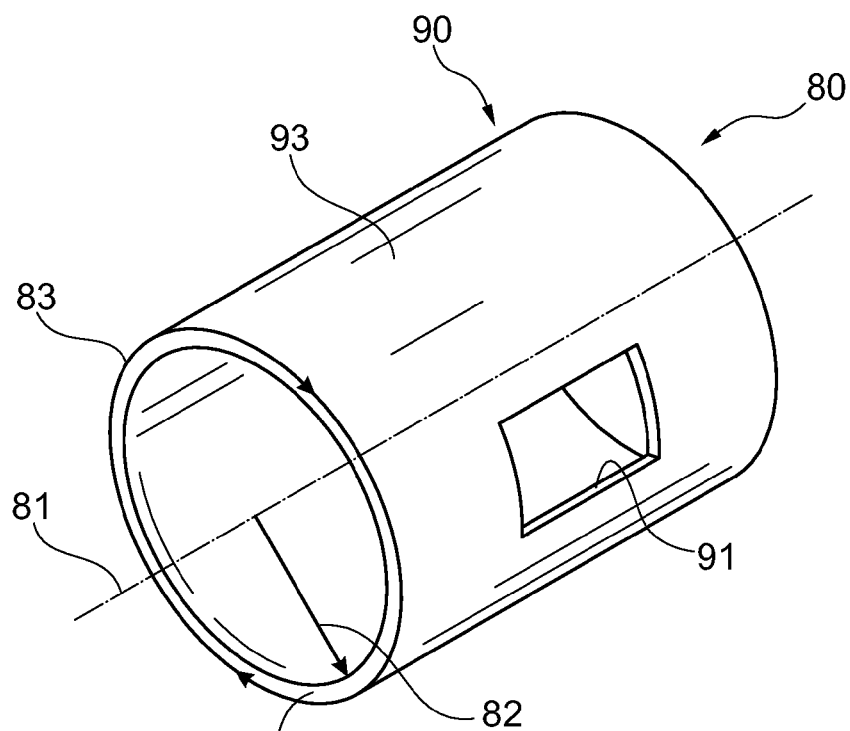

METHOD OF DETERMINING AN OPERATING STATE OF A TRANSMISSION LATCHING VALVE

FIELD

The invention relates generally to a transmission latching valve, and more specifically to a method of determining an operating state of a transmission latching valve.

BACKGROUND

Latching valves are known. An example is shown in commonly-assigned United States Patent Publication No. 2011/0315503. Latching valves may be used to hold pressure in a transmission clutch or brake when an engine is stopped. This pressure helps speed re-engagement of the clutch or brake when the engine is restarted. A transmission strategy may include a desire to determine the operating state of the latching valve to determine whether the latching state has been successfully achieved.

BRIEF SUMMARY

Example aspects broadly comprise a valve monitoring system including a latching valve, a travel sensor, and a processor. The latching valve has a snap spring, a valve piston, and an inlet port. The travel sensor is for measuring travel of the valve piston between an activation pressure and a zero pressure. The processor is connected to the travel sensor for calculating a rate of travel of the valve piston and determining a latched state of the valve. In some example embodiments, the activation pressure is greater than a normal operating pressure. In some example embodiments, determining a latched state of the valve includes calculating a derivative of the rate of travel.

In an example embodiment, the processor is configured to determine that the valve is in a latched state when the derivative steadily decreases over time. In an example embodiment, the processor is configured to determine that the valve is in a latched state when the derivative shows little variation between 40% and 60% of a total travel distance of the valve piston. In an example embodiment, the processor is configured to determine that the valve is in an unlatched state when an absolute value of the derivative decreases then increases over time. In an example embodiment, the processor is configured to determine that the valve is in a latched state when the derivative steadily decreases over time, and the valve is in an unlatched state when an absolute value of the derivative decreases then increases over time. In an example embodiment, the latching valve includes a housing, an activation piston, and a seal operating between the housing and the activation piston to reduce a rate of travel of the activation piston.

Other example aspects broadly comprise a method of determining a latched state of a latching valve including measuring a first displacement time of a valve piston of the valve in response to a pressure drop from an activation pressure to a zero pressure when the valve is in a known latched state, measuring a second displacement time of the valve piston of the valve in response to a pressure drop from an activation pressure to a zero pressure when the valve is in an unknown latched state, and comparing the first displacement time to the second displacement time to determine the latched state of the valve.

In an example embodiment, the method includes determining that the valve is in a latched state when a difference between the first and second displacement times is less than twenty-five percent (25%). In an example embodiment, the method includes determining that the valve is in an unlatched state when the second displacement time is twenty-five percent (25%) or more higher than the first displacement time. In an example embodiment, the method includes measuring the first and second displacement times with a displacement sensor and a timer. In an example embodiment, the method includes comparing the first and second displacement times with a computer processor.

BRIEF DESCRIPTION OF THE DRAWINGS

The nature and mode of operation of the present invention will now be more fully described in the following detailed description taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION

Figure 2:
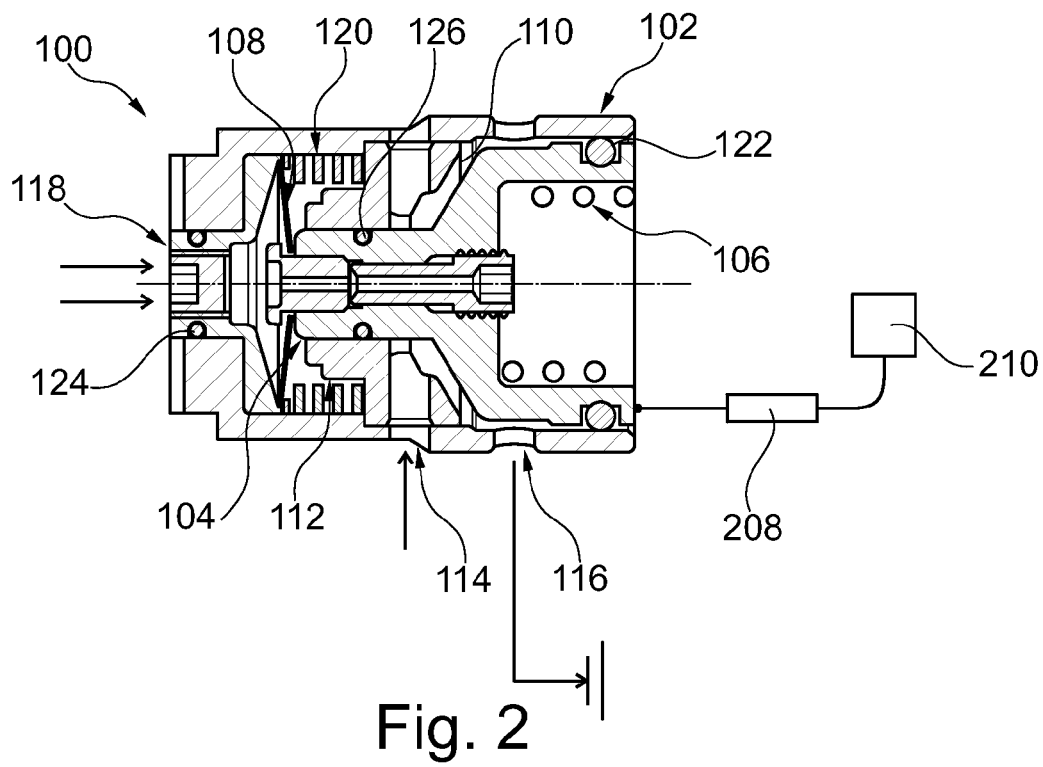
FIG. 2 is a cross-section view of a latching valve shown in an open condition.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a cross-section view of latching valve 100 shown in an open condition. Latching valve 100 includes housing 102, valve piston 104, return spring 106, and snap spring 108. Housing 102 can be installed in a valve body for a vehicle transmission, for example, limiting axial displacement of spring 106 away from the valve. As shown in FIG. 2, during open mode, piston 104 is balanced between the return spring and the snap spring, creating a gap 110 between the piston and valve seat 112, fixed within housing 102. Respective forces of springs 106 and 108 control the width of gap 110 such that the gap is small when the force of spring 106 is greater than that of spring 108, and big when the force from spring 108 is greater. In the open mode, flow entering through inlet port 114 passes through gap 110 to outlet port 116 with little restriction. Outlet port 116 may be connected to a hydraulically applied transmission clutch, for example.

In the open position shown in FIG. 2, pressure acting on snap piston 118 produces a force that is less than the snap-through force of spring 108. That is, spring 108 is a bi-stable spring with two equilibrium positions with a predetermined force required to "snap-through" to the other position. In the open mode, the difference between the pressure force and a force from spring 120, opposing the pressure force, is below the predetermined force and the spring does not "snap-through". Pistons 104 and 118 are sealed to the housing by respective seals 122 and 124, and piston 104 is also sealed to seat 112 by seal 126. Seat 112 is fixed to housing 102 as described above, creating a fluid-tight seal between the components. Seat 112 may be fixed by a press-fit, for example. In an example embodiment, a port connected to the snap piston also connects to port 114 so that the two pressures are equal.

Figure 3:
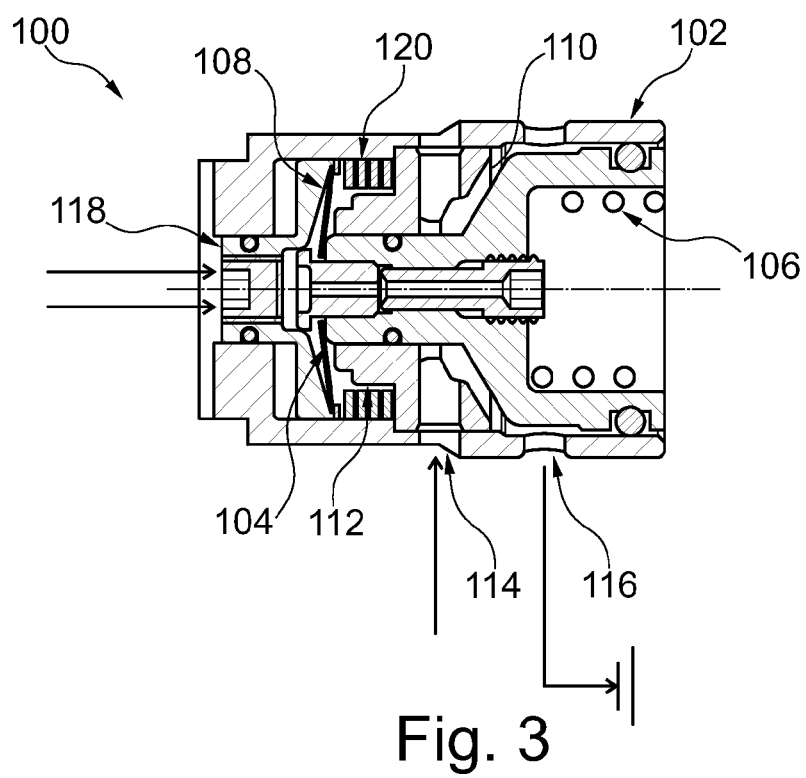
FIG. 3 is a cross-section view of the latching valve of FIG. 2 shown in an overstroke condition.

The following description is made with reference to FIG. 3. FIG. 3 is a cross-section view of latching valve 100 of FIG. 2 shown in an overstroke condition. During an overstroke event, a pressure acting on valve 100 is raised to an overstroke, or activation, pressure that is higher than a normal operating pressure. The force of the overstroke pressure force acting on snap piston 118 overcomes the combined force of springs 108 and 120, moving piston 118 until spring 108 "snaps-through" to its second equilibrium position. Gap 110 is still open because, even though the snap spring is sloped away from piston 104 (as opposed to being sloped towards the piston as shown in FIG. 2), the combined force of spring 108 and the displacement of piston 118 is sufficient to displace spring 106, keeping the valve open. Therefore, port 114 is still connected to port 116 during the overstroke condition. But it is the pressure, as opposed to the spring forces, that is keeping the valve open in this condition.

Figure 4:
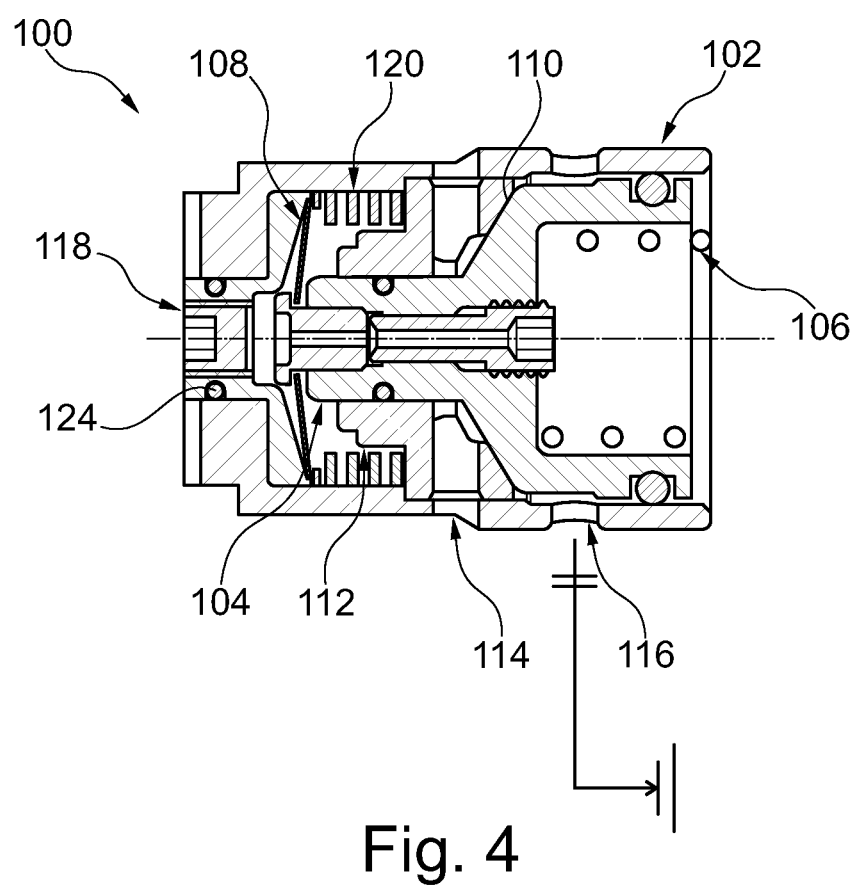
FIG. 4 is a cross-section view of the latching valve of FIG. 2 shown in a latched condition.

The following description is made with reference to FIG. 4. FIG. 4 is a cross-section view of latching valve 100 of FIG. 2 shown in a latched condition. As shown in FIG. 4, once pressure is removed from the valve, snap spring 108 no longer opposes displacement of piston 104, allowing displacement of the piston by spring 106 so that gap 110 is closed. Friction of seal 124 between piston 118 and housing 102 slows displacement of piston 118 as pressure is released. That is, if piston 118 is displaced by spring 120 much faster than piston 104 is displaced by spring 106, snap-spring 108 can be snapped back to its first equilibrium position, unlatching the valve. In other words, seal 124 slows the actuation piston so that the valve piston can keep up.

In the latched condition, the valve is sealed so that pressure in port 116 is maintained even though pressure in port 114 is lowered to a zero pressure. In other words, the transmission clutch connected to port 116 is still pressurized even though the pressure source has been removed. This functionality can be important for fuel economy by maintaining pressure during highway cruising without requiring a pump to continuously pressurize the clutch, or improve lag times between engine restart and vehicle launch for stop-start engine strategies, for example.

Force of spring 106 determines the maintained pressure by opposing the pressure force acting on piston 104. In other words, pressure in port 116 acting on the piston will keep the gap open until the spring force overcomes the residual pressure force. Therefore, spring 106 can be adjusted to maintain a high pressure to keep the clutch engaged and transmitting torque, for example, or a low pressure to release the clutch but maintain a clutch pressure chamber full of oil to speed clutch apply during restarts as described above.

Once a normal operating pressure (lower than the overstroke pressure but higher than the maintained pressure) is applied to valve 100, piston 104 compresses spring 106 to open gap 110. Button 126, fixed to piston 104, pulls spring 108 to, in combination with spring 120, return the snap spring to its first equilibrium position so that the valve is reset to the open position as shown in FIG. 2 described above.

It is important to monitor the state of valve 100 to ensure proper operation of the transmission. For example, if valve 100 is operating in a pressure-holding state and pressure in port 116 is holding a clutch engaged, a transmission shift into another gear could damage the transmission. Similarly, vehicle launch may be erratic if the vehicle is restarted with an engaged clutch. Or a technician or safety worker may be injured by pressurized fluid if they are unaware that there is pressurized fluid in the transmission. Depending on the transmission configuration, it may be difficult to measure pressure in port 116, however.

Valve 100 can be part of a valve monitoring system including sensor 208 and processor 210 shown in FIG. 2. Processor 210 may be a computer processor, for example. Sensor 208 measures travel of valve piston 104 between the activation pressure and a zero pressure in port 114. That is, as described above, piston 104 is axially displaced by pressure in port 114, and sensor 208 is arranged to measure a position of the piston. Processor 210 is connected to the sensor and includes a timing device, or timer, such that the rate of travel of the piston can be determined. In other embodiments, the timer may be external to processor 210. The sensor is configured to determine a latched state of the valve by calculating a derivative of the rate of travel as described in more detail below.

Figure 5:
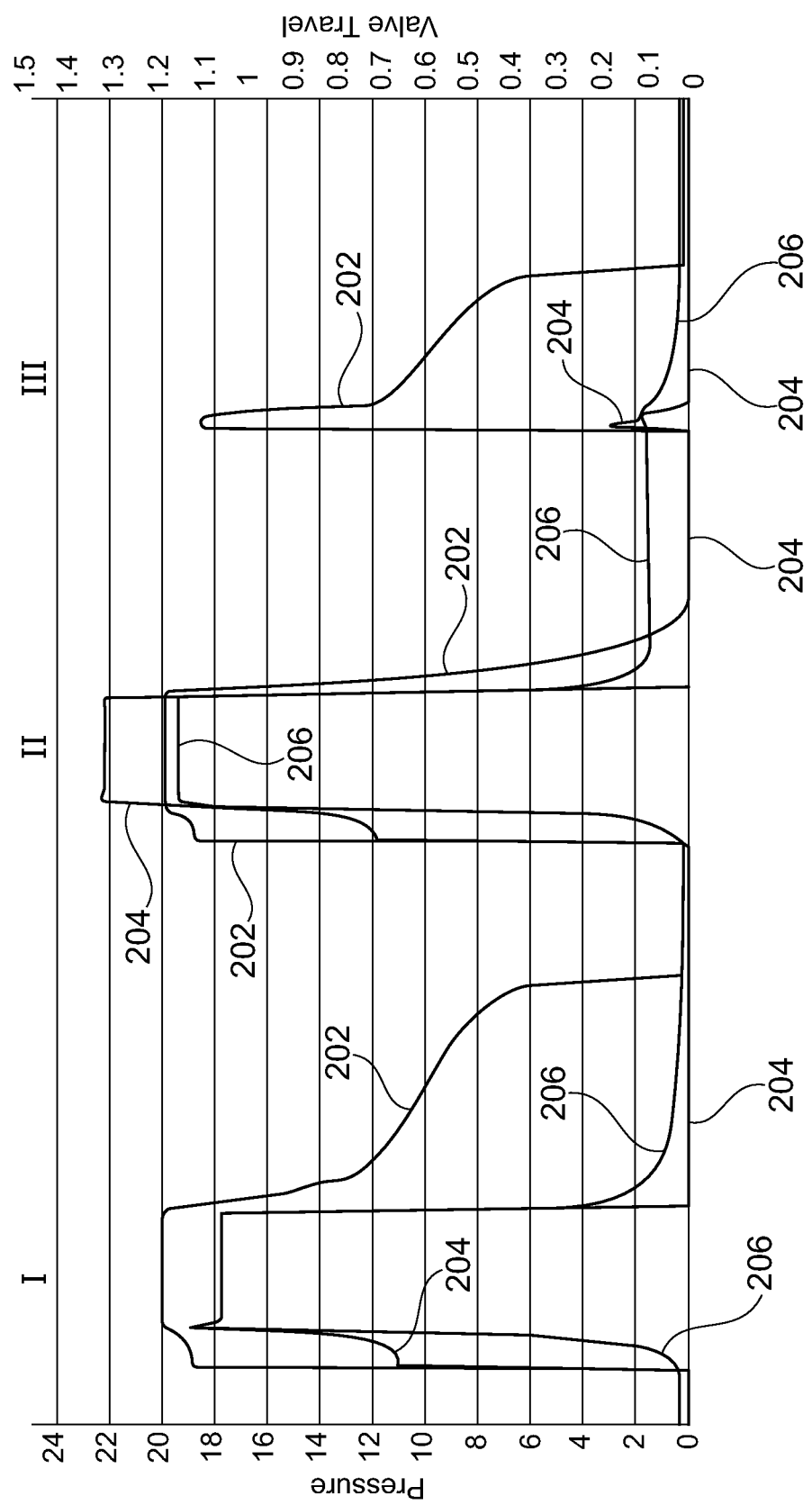
FIG. 5 is a plot of valve travel and pressure showing various operating states of the valve of FIG. 2.

The following description is made with reference to FIGS. 2-5. FIG. 5 is a plot of valve travel and pressure showing various operating states of valve 100. Three distinct segments are shown corresponding the FIGS. 2-4. The inventor has devised a novel method of monitoring an operating state of a latching valve such as valve 100 through measurement of piston displacement and without measuring pressure in port 116. To illustrate this point, plot 200 includes displacement trace 202, pressure trace 204 of pressure in inlet port 114, and pressure trace 206 of pressure in outlet port 116. All traces are plotted against time, as the rate of travel has been shown as an important way to determine the valve operating state. It should be noted that the measurement was conducted on a test fixture since pressure measurement in a vehicle may be difficult or expensive as described above.

In the first segment, inlet pressure 204 is raised and lowered and outlet pressure 206 follows. The valve is in a non-latched state. Displacement 202 occurs quickly under pressure, but slowly moves back to an initial position after pressure is removed. That is, there is a period of travel during which the piston moves very slowly on its way back to its starting position. The second segment again shows a close following of the inlet and outlet pressures, but the outlet pressure does not return to zero as the inlet pressure drops to zero since the valve is now in a latched state and some pressure is maintained as described above. Piston displacement is rapid as pressure increases to the activation pressure, and nearly as rapid as pressure is released. There is no slow portion as in the first segment. Finally, once inlet pressure is increased above the held outlet pressure, the valve returns to a non-latched state and both pressures drop to zero as the inlet pressure is lowered. As in the first segment, the displacement has a slow travel period as it returns to its initial position.

Displacement trace 202 can be measured by a sensor such as sensor 208 shown in FIG. 2. Sensor 208 may be incorporated into the transmission valve body, for example. It should also be noted that attempts to determine the valve state by calibrating the sensor and relying on a position of the piston were unreliable because the piston position was inconsistent due to friction from the seals and hysteresis in the springs. In other words, gap 110 varied based on parameters such as temperature and oil viscosity. The method described below was found to be highly robust during all operating conditions.

Processor 210 can be configured to determine that the valve is in a latched state when the derivative steadily decreases over time. That is, when pressure in port 114 is lowered to zero, the rate of travel of the piston gradually slows until it reaches an equilibrium point because the force of spring 106 is lessened as the spring is relaxed and the friction force from the seals remains constant. Therefore, when the pressure is first reduced, the spring is compressed and the force acting on piston 104 is high.

As the piston moves away from the spring, the force gradually lowers and until the piston stops moving. As shown in a middle segment of the graph of FIG. 5, the slope (and the derivative) of the trace is negative (moving from a high travel distance to a low travel distance), and the derivative is gradually increasing (approaching zero) throughout the travel.

Processor 210 can be configured to determine that the valve is in a latched state when the derivative shows little variation between 40% and 60% of a total travel distance of the valve piston. That is, in the second segment, the slope of curve 202 between a high pressure, high travel point and a low pressure, low travel point, is relatively constant for travel distances near the midway point.

The processor can be configured to determine that the valve is in an unlatched state when an absolute value of the derivative decreases then increases over time. That is, during the first portion of the pressure-lowering side of trace 202, the slope is steep but steadily decreases until reaching a transition point where it returns to a steep decline. The slowing of the displacement of valve piston 104 is due to resistance from snap spring 108. That is, the force of spring 106 is opposed by spring 104, lowering the effective force of spring 106 and slowing displacement of the piston. The processor can also be configured to determine that the valve is in an unlatched state when the time required to move the piston to its initial point state after inlet pressure is reduced is greater than a reference time for the same displacement when the valve is in a known latched.

The following method can be used to determine a latched state of latching valve 100. It may not be necessary to perform the steps in any particular order. A first step includes measuring a first displacement time of valve piston 104 of the valve in response to a pressure drop from an activation pressure to a zero pressure when the valve is in a known latched state. A second step includes measuring a second displacement time of the valve piston of the valve in response to a pressure drop from an activation pressure to a zero pressure when the valve is in an unknown latched state. A third step includes comparing the first displacement time to the second displacement time to determine the latched state of the valve.

A fourth step may include determining that the valve is in a latched state when a difference between the first and second displacement times is less than twenty-five percent (25%). A fifth step may include determining that the valve is in an unlatched state when the second displacement time is twenty-five percent (25%) or more higher than the first displacement time. A sixth step may include measuring the first and second displacement times with a displacement sensor and a timer. A seventh step may include comparing the first and second displacement times with a computer processor.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:
1. A valve monitoring system comprising:
   a latching valve with a snap spring, a valve piston, and an inlet port;
   a travel sensor for measuring travel of the valve piston between an activation pressure and a zero pressure; and,
   a processor connected to the travel sensor for calculating a rate of travel of the valve piston and determining a latched state of the valve, wherein:
      the activation pressure is greater than a normal operating pressure;

determining the latched state of the valve includes calculating a derivative of the rate of travel; and, the processor is configured to determine that the valve is in the latched state when the derivative shows little variation between 40% and 60% of a total travel distance of the valve piston.

2. The valve monitoring system of claim 1 wherein the processor is configured to determine that the valve is in the latched state when the derivative steadily decreases over time.

3. The valve monitoring system of claim 1 wherein the processor is configured to determine that the valve is in an unlatched state when an absolute value of the derivative decreases then increases over time.

4. The valve monitoring system of claim 1 wherein the processor is configured to determine that:

the valve is in the latched state when the derivative steadily decreases over time; and, the valve is in an unlatched state when an absolute value of the derivative decreases then increases over time.

5. The valve monitoring system of claim 1 wherein the latching valve further comprises:

a housing;

an activation piston; and, a seal operating between the housing and the activation piston to reduce a rate of travel of the activation piston.

* * * * *